3,008,976
PHOSPHOROUS ACID ESTERS

Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed July 2, 1958, Ser. No. 746,110
Claims priority, application Germany July 10, 1957
9 Claims. (Cl. 260—461)

The present invention relates to new and useful phosphorous acid esters. More particularly S-alkyl-O.O-dialkyl- or S-alkyl-O-alkyl-N-dialkyl-amino-phosphorous acid esters of the general formula

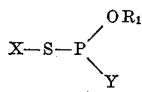

wherein $R_1$ stands for preferably low molecular weight hydrocarbon radicals, X denotes an alkyl radical substituted by aliphatic or aromatic thioether groups and Y means either $OR_1$ or the radical of a secondary amine. Compounds of the above type if being derived from thiophosphoric acid or phosphoric acid are well known insecticides or plant protecting agents and are widely used in the agricultural field. Thus the O.O-diethyl-O-ethylmercapto ethyl phosphorthionate is known as demeton being a very powerful insecticide. It is an object of the present invention to provide new and useful phosphorous acid ester insecticides. A further object is a process to prepare these new compounds. Still further objects will become apparent as the following description proceeds.

In accordance with the invention it has now been found that the above shown new compounds can be prepared by reacting O.O-dialkyl-phosphorous acid monochlorides or N-dialkylamino-O-alkyl-phosphorous acid chlorides, with salts of appropriately substituted mercaptans. The following schemes are given to illustrate the process:

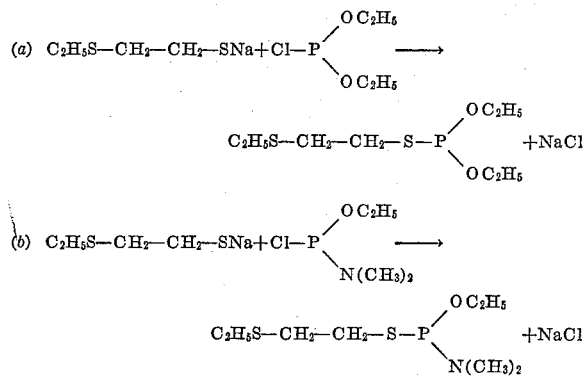

It has to be understood, however, that this particular reaction has been given by way of illustration only and that other alkyl or aryl mercapto alkyl mercaptans as well as other O.O-dialkyl or N-dialkyl amino-O-alkyl phosphorous acid halides may also be used to obtain the new compounds of the inventive type.

The reaction is expediently carried out in inert solvents and at an elevated temperature but with the exclusion of atmospheric oxygen. Benzene, toluene and ether have proved to be suitable solvents. Temperatures of between 30 and 70° C. are normally suitable.

The new compounds of the present invention very effectively kill insects like flies, mites, aphids, etc. They distinguish themselves especially by a good contact-insecticidal activity and at the same time by an activity on eating insects such as caterpillars. Most compounds also have an excellent activity against the ovae of the red spider. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formulae

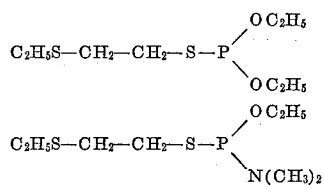

have been tested against spider mites and aphids. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture is then diluted with water to the desired concentration.

The tests have been carried out in the following manner: (A) against spider mites (contact-insecticidal action). Bean plants (*Phaseolus vulgaris*) of about 15 inches height are sprayed drip wet with 0.001% solutions prepared as indicated above. The bean plants have been infested heavily with the two-spotted spider (species *Tetranychus telarius*). Evaluation has been carried out after 24 hours, 48 hours and 8 days. Total percentage after 8 days: 100%; (B) against aphids (species *Doralis fabae*). Heavily infested bean plants (*vitia faba*) have been sprayed drip wet with 0.01% solutions as prepared above. The effect has been determined by evaluation after 24 hours by counting the dead pests either on the surface of the soil or still remaining on the plants. Complete killing has been observed after said 24 hours.

The following examples are given for the purpose of illustrating the invention.

Example 1

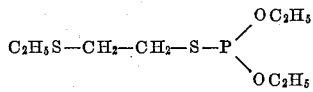

To a suspension of 0.3 mol of the sodium salt of β-ethylmercapto-ethylmercaptan (obtainable from 36.6 grams of β-ethylmercapto-ethylmercaptan and 6.9 grams of finely divided sodium powder in 100 millilitres of benzene) 53 grams of freshly distilled diethyl-phosphonic acid monochloride are added dropwise with stirring and simultaneously passing through a current of nitrogen at 20–25° C. The mixture is stirred at 35 to 40° C. for an hour and then cooled to room temperature. By the addition of 5 millilitres of water the sodium chloride precipitating first in a colloidal state is brought into a form suitable for filtering. The product is filtered off with suction from the sodium chloride and the filtrate is fractionated; 60.5 grams of the new ester of B.P. 40–45° C./0.1 mm. Hg are thus obtained. Yield: 83% of the theoretical.

0.001% solutions kill red spiders and also the eggs of red spiders with certainty.

By exactly the same way but using instead of the sodium salt of β-ethyl mercaptoethyl mercaptan, β-phenylmercapto ethylmercaptan there is obtained the ester of the following formula

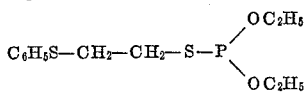

Other esters of this type which may be prepared exactly following the reaction procedure described above are

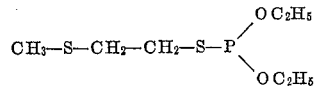

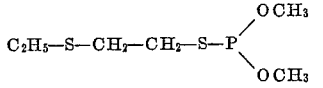

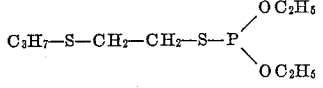

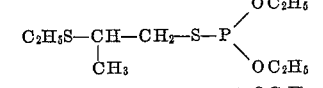

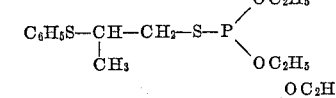

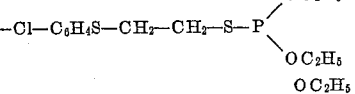

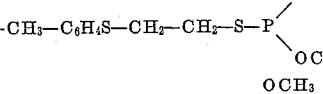

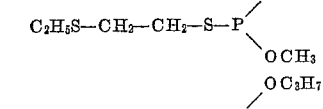

*Example 2*

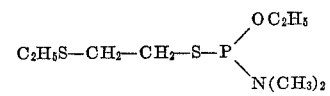

7 grams of finely divided sodium are suspended in 100 millilitres of benzene. 38 grams of β-ethylmercapto ethylmercaptan are added thereto at room temperature while passing through nitrogen. The mixture is heated to 40° C. for 20 minutes and 50 grams of diethyl amino ethyl phosphonic acid monochloride (B.P. 52–53° C./12 mm. Hg) are then added dropwise. A temperature of 50–55° C. is maintained for a further hour and the mixture is then worked up as described in Example 1. 40 grams of the new ester are thus obtained as a colorless sparingly water-soluble oil of B.P. 60–65° C./0.05 mm. Hg.

Toxicity on rats per os $LD_{95}$ 100 mg./kg. Aphids and spider mites are killed completely with solutions of 0.1% and 0.01%.

By exactly the same way there may be obtained by starting from the corresponding reaction components the compounds of the following formulae

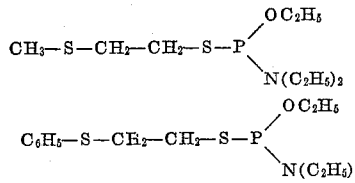

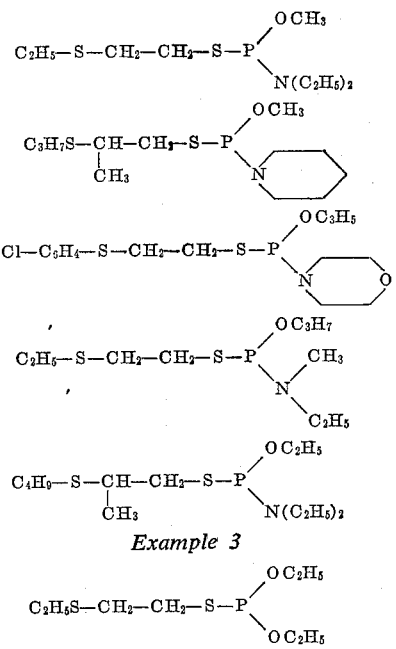

*Example 3*

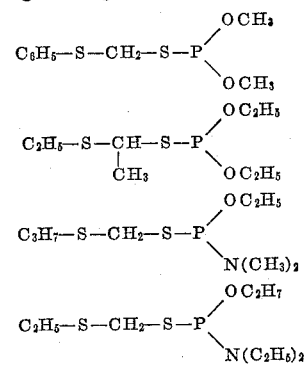

To a suspension of 0.4 mol of the sodium salt of α-ethylmercapto-methylmercaptan (obtainable from 43.2 grams of α-ethylmercapto-methylmercaptan (B.P. 50–55° C./10 mm. Hg) and 9.2 grams of finely divided sodium powder) in 150 millimetres of benzene are added dropwise with cooling and simultaneously passing through nitrogen 62.6 grams of diethylphosphonic acid chloride. The exothermic reaction is kept at 20–25° C. by cooling. After stirring for a further two hours, about 5 millilitres of water are added dropwise whereupon the precipitated colloidal sodium chloride is brought into a form suitable for filtering. After filtering off the sodium chloride with suction, the filtrate is fractionated in a current nitrogen. 72 grams of the new ester of B.P. 37–39° C./0.01 mm. Hg are thus obtained. Yield: 79.3% of the theoretical.

0.001% solutions of the ester kill red spiders and their eggs (i.e. they also possess an ovicidal action) as well as aphids with certainty.

In the same manner there may be obtained the compounds shown below if the reaction is carried out with the corresponding starting materials.

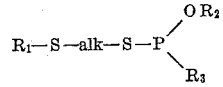

We claim:
1. Phosphorous acid esters of the general formula

$$R_1-S-alk-S-P\begin{matrix}OR_2\\R_3\end{matrix}$$

wherein alk stands for a lower alkylene radical up to 4 carbon atoms, $R_1$ stands for a member selected from the group consisting of lower alkyl and phenyl radicals, $R_2$ stands for an alkyl radical up to 4 carbon atoms, and $R_3$ stands for a member selected from the group consisting of $OR_2$ and $N(R_4)_2$, wherein $N(R_4)_2$ represents a member of the group consisting of di-lower alkylamino having up to 6 carbon atoms, morpholino and piperidino radicals.

2. Phosphorous acid esters of the general formula

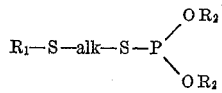

wherein alk stands for a lower alkylene radical up to 4 carbon atoms, $R_1$ stands for a member selected from the group consisting of lower alkyl and phenyl radicals, $R_2$ stands for an alkyl radical up to 4 carbon atoms.

3. Phosphorous acid esters of the general formula

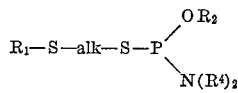

wherein alk stands for a lower alkylene radical up to 4 carbon atoms, $R_1$ stands for a member selected from the group consisting of lower alkyl and phenyl radicals, $R_2$ stands for an alkyl radical up to 4 carbon atoms, and $N(R_4)_2$ represents a member of the group consisting of di-lower alkylamino having up to 6 carbon atoms, morpholino and piperidino radicals.

4. The phosphorous acid ester of the general formula

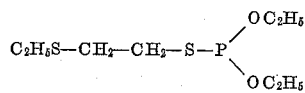

5. The phosphorous acid ester of the general formula

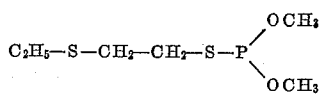

6. The phosphorous acid ester of the general formula

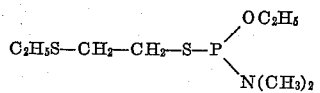

7. The phosphorous acid ester of the general formula

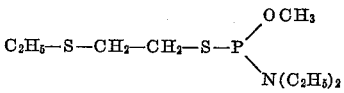

8. The phosphorous acid ester of the general formula

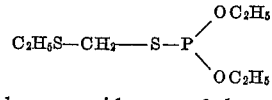

9. The phosphorous acid ester of the general formula

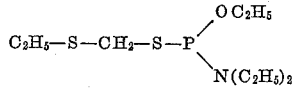

References Cited in the file of this patent
FOREIGN PATENTS

| | | |
|---|---|---|
| 1,164,209 | France | May 12, 1958 |
| 191,431 | Austria | Aug. 26, 1957 |

UNITED STATES PATENT OFFICE
CERTIFICATION OF CORRECTION

Patent No. 3,008,976            November 14, 1961

Walter Lorenz et al.

It is hereby certified that error appears in the above numbered patent requiring correction and that the said Letters Patent should read as corrected below.

Column 4, lines 24 to 27, the formula should appear as shown below instead of as in the patent:

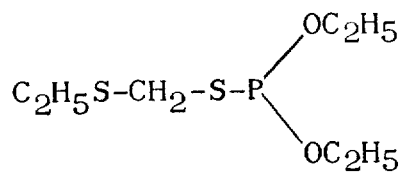

line 30, for "50-55°" read -- 50-52° --; same column 4, lines 60 to 63, the formula should appear as shown below instead of as in the patent:

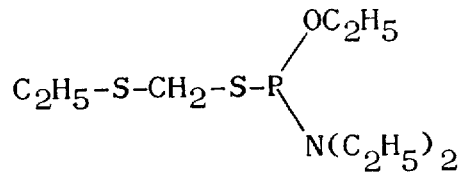

Signed and sealed this 8th day of May 1962.

(SEAL)
Attest:

ERNEST W. SWIDER            DAVID L. LADD

Attesting Officer            Commissioner of Patents